US012662191B2

(12) United States Patent
Chinthoju et al.

(10) Patent No.: US 12,662,191 B2
(45) Date of Patent: Jun. 23, 2026

(54) TARGET VEHICLE POSITION PREDICTION FOR ASSISTED LANE CHANGE

(71) Applicant: Aptiv Technologies AG, Schaffhausen (CH)

(72) Inventors: Prajwal Kumar Chinthoju, Carmel, IN (US); Matthew Robert Smith, Springboro, OH (US)

(73) Assignee: Aptiv Technologies AG, Schaffhausen (CH)

( * ) Notice: Subject to any disclaimer, the term of this patent is extended or adjusted under 35 U.S.C. 154(b) by 66 days.

(21) Appl. No.: 18/661,949

(22) Filed: May 13, 2024

(65) Prior Publication Data

US 2025/0346295 A1 Nov. 13, 2025

(51) Int. Cl.
| | |
|---|---|
| *B62D 15/02* | (2006.01) |
| *B60W 10/20* | (2006.01) |
| *B60W 30/095* | (2012.01) |
| *B60W 30/18* | (2012.01) |

(52) U.S. Cl.
CPC ......... *B62D 15/0255* (2013.01); *B60W 10/20* (2013.01); *B60W 30/0956* (2013.01); *B60W 30/18163* (2013.01)

(58) Field of Classification Search
CPC .............. B62D 15/0255; B60W 10/20; B60W 30/0956; B60W 30/18163
USPC ......................................................... 701/41
See application file for complete search history.

(56) References Cited

U.S. PATENT DOCUMENTS

| | | | |
|---|---|---|---|
| 2019/0113927 A1 | 4/2019 | Englard | |
| 2021/0004012 A1* | 1/2021 | Marchetti-Bowick | ...................... G05D 1/0221 |
| 2022/0126882 A1 | 4/2022 | Oh | |
| 2024/0092398 A1* | 3/2024 | Caldwell | ............... B60W 10/04 |

OTHER PUBLICATIONS

European Patent Office, Extended European Search Report regarding European Application No. 24183814.3, dated Jan. 14, 2025, 10 pages.
Jeong et al., "Surround Vehicle Motion Prediction Using LSTM-RNN for Motion Planning of Autonomous Vehicles at Multi-Lane Turn Intersections," in IEEE Open Journal of Intelligent Transportation Systems, vol. 1, pp. 2-14, Feb. 13, 2020, doi: 10.1109/OJITS. 2020.2965969.

* cited by examiner

*Primary Examiner* — Yi-Kai Wang
(74) *Attorney, Agent, or Firm* — Miller Johnson

(57) ABSTRACT

A system includes a vehicle location prediction module (VLPM) configured to receive sensor data associated with a set of target vehicles. For each respective target vehicle, the VLPM is configured to determine a prediction corresponding to the respective target vehicle. The prediction is based on a set of criteria. The prediction includes a plurality of prediction segments corresponding to future time intervals. The prediction indicates a position of the respective target vehicle at each of the plurality of prediction segments. A first prediction segment of the plurality of prediction segments is based on the sensor data. The first prediction segment of the plurality of prediction segments includes maintaining or adjusting a target vehicle acceleration or executing a portion of a lane change based on the outcome of the set of criteria. A second prediction segment of the plurality of prediction segments is based on the first prediction segment.

20 Claims, 6 Drawing Sheets

TARGET VEHICLE POSITION PREDICTION FOR ASSISTED LANE CHANGE

FIELD

The present disclosure relates to autonomous vehicles and driving assistance and, in particular, to predicting gaps for lane change assistance.

BACKGROUND

Modern vehicles often integrate software-driven platforms with advanced sensing and control to provide some degree of assistance to the driver. One example of driver assistance is assisted or autonomous lane changes. The vehicle system gathers data from various onboard sensors regarding the surroundings of the vehicle. The obtained data is then analyzed to determine whether a lane change is possible.

Some lane change assistance systems are capable of performing a lane change only when an adjacent lane is empty (that is, there is not a vehicle in the adjacent lane). Other methods rely on machine learning models for motion prediction (for example, of vehicles surrounding the ego vehicle). These methods are computationally expensive and unable to update the prediction with high frequency.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system includes a vehicle location prediction module configured to receive sensor data associated with a set of target vehicles. The sensor data indicates positions of the set of target vehicles with respect to a host vehicle. The vehicle location prediction module is configured to, for each respective target vehicle of a subset of the set of target vehicles, determine a prediction corresponding to the respective target vehicle. The prediction is based on a set of criteria. The prediction includes a plurality of prediction segments corresponding to future time intervals. The prediction indicates a position of the respective target vehicle at each of the plurality of prediction segments. A first prediction segment of the plurality of prediction segments is based on the sensor data. The first prediction segment of the plurality of prediction segments includes, based on a first outcome of the set of criteria, maintaining an acceleration associated with the respective target vehicle. The first prediction segment of the plurality of prediction segments includes, based on a second outcome of the set of criteria, adjusting the acceleration associated with the respective target vehicle. The first prediction segment of the plurality of prediction segments includes, based on a third outcome of the set of criteria, executing a portion of a lane change maneuver associated with the respective target vehicle. A second prediction segment of the plurality of prediction segments is based on the first prediction segment. The system includes a gap selection module configured to determine a host vehicle lane change location based on the prediction corresponding to the respective target vehicle.

In other features, the plurality of prediction segments corresponds to contiguous time intervals of equal duration.

In other features, a duration of the contiguous time intervals is 10-500 milliseconds. In other features, the prediction indicates a speed of the respective target vehicle at teach of the plurality of prediction segments. In other features, the sensor data is received from a set of sensors configured to detect the set of target vehicles. In other features, the system includes an autonomous vehicle control module configured to execute an automated lane change maneuver based on the host vehicle lane change location.

In other features, the vehicle location prediction module is configured to, in response to a determination that a duration of the prediction exceeds a prediction threshold, output the prediction to the gap selection module. In other features, the vehicle location prediction module is configured to, in response to a determination that the duration of the prediction does not exceed a prediction threshold, determine a third prediction segment.

In other features, the vehicle location prediction module is configured to determine a prediction corresponding to each vehicle in the set of target vehicles. In other features, determining the host vehicle lane change location is based on a gap between two target vehicles of the set of target vehicles including a size of the gap, a duration of existence associated with the gap, or a time of appearance associated the gap.

In other features, the set of criteria includes, a criterion that is met when the respective target vehicle is categorized in a first category, a criterion that is met when the respective target vehicle is categorized in a second category, a criterion that is met when the respective target vehicle is categorized in a third category, a criterion that is met when a lead vehicle exists ahead of the respective target vehicle, a criterion that is met when a gap between the lead vehicle and the respective target vehicle meets a first threshold distance, a criterion that is met when the gap between the lead vehicle and the respective target vehicle meets a second threshold distance, a criterion that is met when a speed of the respective target vehicle exceeds a speed of the lead vehicle, a criterion that is met when the speed of the respective target vehicle exceeds a threshold speed, a criterion that is met when a gap exists adjacent to the respective target vehicle, a criterion that is met when the speed of the respective target vehicle is outside of a threshold range, and a criterion that is met when an acceleration of the respective target vehicle is outside of a threshold range.

11. A method includes receiving sensor data associated with a set of target vehicles. The sensor data indicates positions of the set of target vehicles with respect to a host vehicle. The method includes, for each respective target vehicle of a subset of the set of target vehicles, determining a prediction corresponding to the respective target vehicle. The prediction is based on a set of criteria. The prediction includes a plurality of prediction segments corresponding to future time intervals. The prediction indicates a position of the respective target vehicle at each of the plurality of prediction segments. A first prediction segment of the plurality of prediction segments is based on the sensor data. The first prediction segment of the plurality of prediction segments includes, based on a first outcome of the set of criteria, maintaining an acceleration associated with the respective target vehicle. The first prediction segment of the plurality of prediction segments includes, based on a second outcome of the set of criteria, adjusting the acceleration associated with the respective target vehicle. The first prediction segment of the plurality of prediction segments includes, based on a third outcome of the set of criteria, executing a portion of a lane change maneuver associated with the respective target vehicle. A second prediction segment of the plurality of prediction segments is based on the first prediction segment. The method includes determining a host vehicle lane change location based on the prediction corresponding to the respective target vehicle.

In other features, plurality of prediction segments corresponds to contiguous time intervals of equal duration. In other features, a duration of the contiguous time intervals is 10-500 milliseconds. In other features, the prediction indicates a speed of the respective target vehicle at teach of the plurality of prediction segments. In other features, the sensor data is received from a set of sensors configured to detect the set of target vehicles.

In other features, the method includes executing an automated lane change maneuver based on the host vehicle lane change location. In other features, the method includes, in response to a determination that a duration of the prediction exceeds a prediction threshold, outputting the prediction. In other features, the method includes, in response to a determination that the duration of the prediction does not exceed a prediction threshold, determining a third prediction segment.

In other features, determining the host vehicle lane change location is based on a gap between two target vehicles of the set of target vehicles including a size of the gap, a duration of existence associated with the gap, or a time of appearance associated the gap.

A non-transitory computer-readable storage medium stores processor-executable instructions. The instructions include receiving sensor data associated with a set of target vehicles. The sensor data indicates positions of the set of target vehicles with respect to a host vehicle. The instructions include, for each respective target vehicle of a subset of the set of target vehicles, determining a prediction corresponding to the respective target vehicle. The prediction is based on a set of criteria. The prediction includes a plurality of prediction segments corresponding to future time intervals. The prediction indicates a position of the respective target vehicle at each of the plurality of prediction segments. A first prediction segment of the plurality of prediction segments is based on the sensor data. The first prediction segment of the plurality of prediction segments includes, based on a first outcome of the set of criteria, maintaining an acceleration associated with the respective target vehicle. The first prediction segment of the plurality of prediction segments includes, based on a second outcome of the set of criteria, adjusting the acceleration associated with the respective target vehicle. The first prediction segment of the plurality of prediction segments includes, based on a third outcome of the set of criteria, executing a portion of a lane change maneuver associated with the respective target vehicle. A second prediction segment of the plurality of prediction segments is based on the first prediction segment. The instructions include determining a host vehicle lane change location based on the prediction corresponding to the respective target vehicle.

In other features, the instructions include plurality of prediction segments corresponds to contiguous time intervals of equal duration. In other features, a duration of the contiguous time intervals is 10-500 milliseconds. In other features, the prediction indicates a speed of the respective target vehicle at teach of the plurality of prediction segments. In other features, the sensor data is received from a set of sensors configured to detect the set of target vehicles. In other features, the instructions include executing an automated lane change maneuver based on the host vehicle lane change location.

In other features, the instructions include, in response to a determination that a duration of the prediction exceeds a prediction threshold, outputting the prediction. In other features, the instructions include, in response to a determination that the duration of the prediction does not exceed a prediction threshold, determining a third prediction segment.

In other features, determining the host vehicle lane change location is based on a gap between two target vehicles of the set of target vehicles including a size of the gap, a duration of existence associated with the gap, or a time of appearance associated the gap.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Introduction

Figure 1:
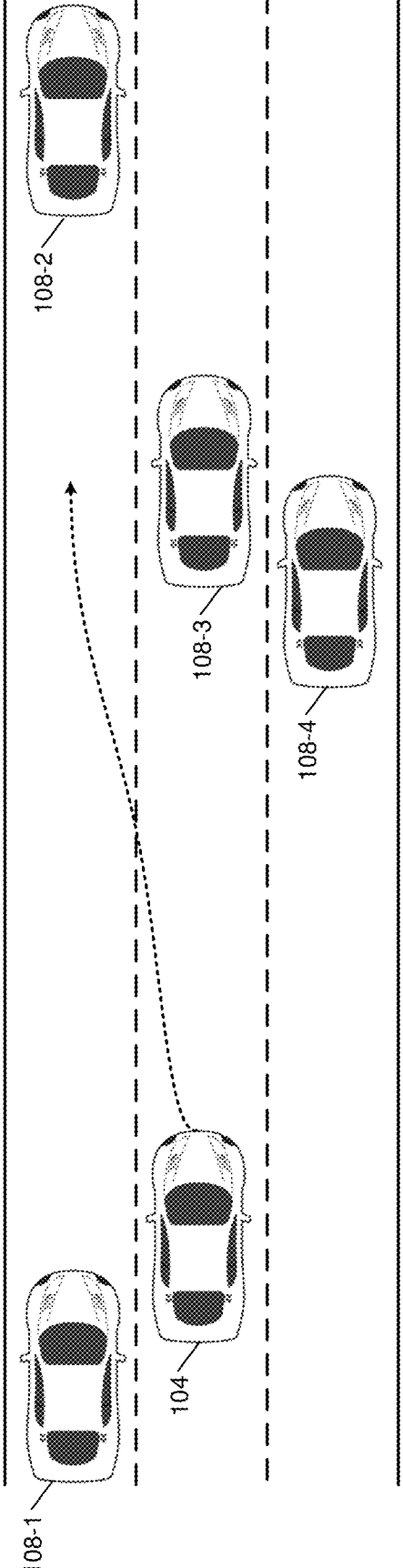
FIG. 1 is a graphical example of a potential lane change.

The present disclosure proposes a computationally-light predictor for the location and speed of vehicles in the vicinity of a host (or ego) vehicle. For example, in FIG. 1 host vehicle 104 is surrounded by target vehicles 108-1, 108-2, 108-3, and 108-4. The proposed method enables shorter computational time than those available via machine learning models. The shortened computational time allows for the prediction to be created and updated at a higher frequency, which allows for more accurate predictions. Generating a prediction of where vehicles will be (rather than where vehicles are) allows for lane change assistance to be available to host vehicle 104 in more diverse situations. For example, some lane change assistance systems are only available to perform an assisted lane change when a gap is directly across from host vehicle 104 (for example, to the right of host vehicle 104). The present disclosure enables assisted lane change maneuvers to be executed when a gap is not immediately adjacent to host vehicle 104 (for example, ahead and to the left of host vehicle 104).

Prediction Segments

The proposed method determines a location and speed prediction for each vehicle (that is, a target vehicle) in the vicinity of the host vehicle. In some implementations, all vehicles within range of the host vehicle's sensors are analyzed. In some implementations, vehicles within a threshold range are analyzed. In some implementations, vehicles that are detected by the host vehicle's sensors are analyzed. The proposed method creates a prediction for each vehicle in time segments. In some implementations, the prediction is made up of time segments that are 1, 10, 20, 50, 100, 500, and/or 1000 ms. For example, a prediction is made for each target vehicle for the first time segment (for example, 0-20 ms), then predictions are determined for each target vehicle for the next time segment (for example, 21-40 ms). In some implementations, the prediction segments are created until the prediction has reached a threshold length, such as 1, 5, 10, 20, and/or 30 seconds. Each prediction segment includes predicted speed, trajectory, acceleration, position, and/or lane assignments for each target vehicle. The vehicle immediately ahead of each target vehicle is also tracked (if it exists) in each prediction segment.

Vehicle Coordinates

Each prediction is based on information received from sensors that communicate the host vehicle, such as radar, lidar, cameras, vehicle-to-vehicle communication systems, etc. Data such as position, speed, and acceleration in both longitudinal and lateral directions are received from the sensors in communication with the host vehicle and used to create the prediction.

In some implementations, the sensor data is received in vehicle coordinate system (VCS), which is a coordinate system defined with respect to the host vehicle. For example, in a two dimensional plane, the host vehicle would be (0,0) in the VCS. In some implementations, the data is converted from VCS to Frenet coordinate system, which defines the target vehicle data with respect to the road. For example, in Frenet coordinates, longitudinal movement is along the direction of the road, and latitudinal movement is perpendicular to the road (that is, the direction of travel) In some implementations, the first segment of prediction is based on data from the host vehicle, and later segments are based on the previous prediction segment(s) and the sensor data. In some implementations, later prediction segments are based only the previous prediction segment(s).

Block Diagram

Figure 2:
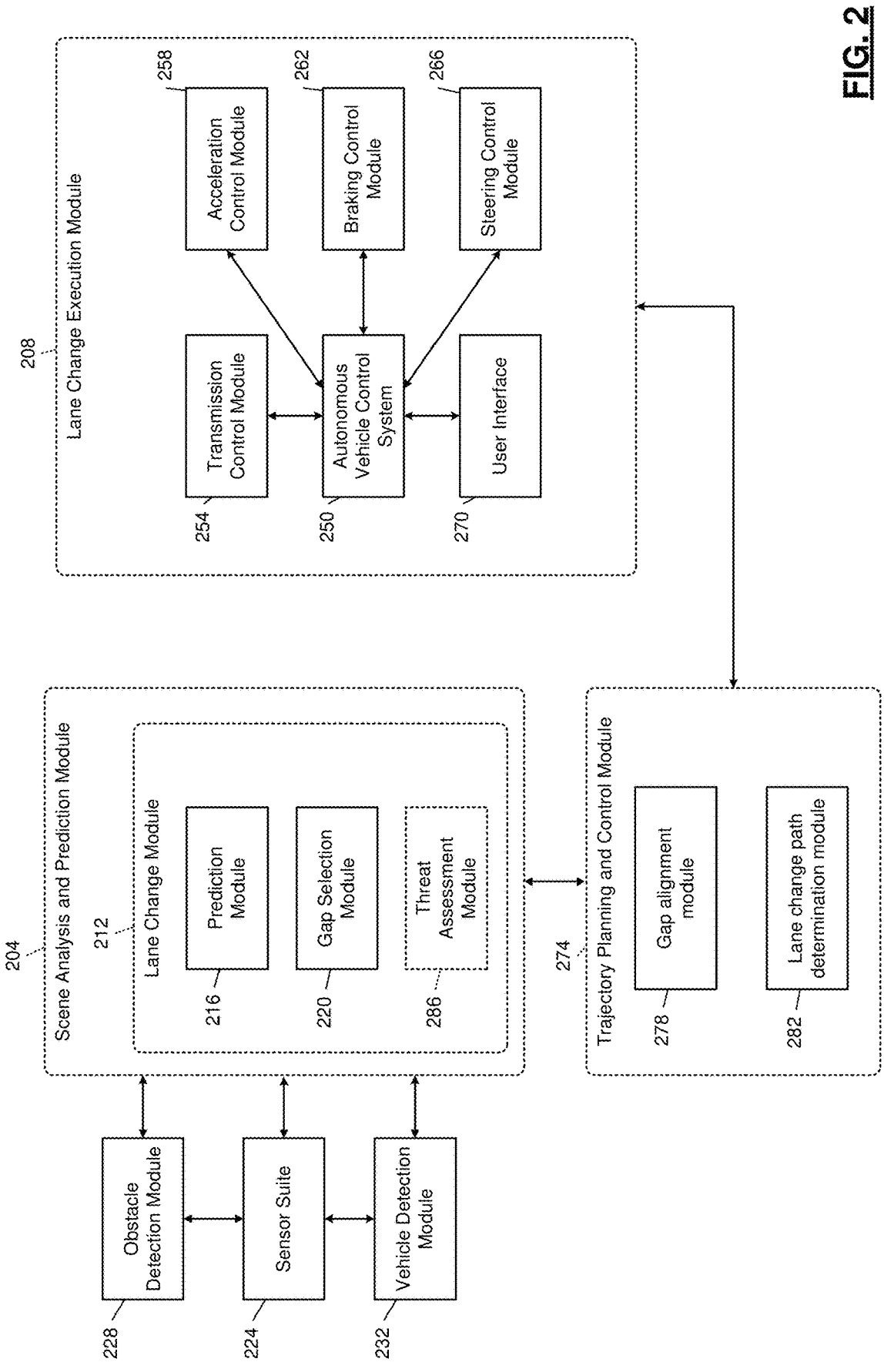
FIG. 2 is a block diagram of an example system for autonomous lane changes.

FIG. 2 is a block diagram of an example system used to generate a movement prediction of target vehicles surrounding the host vehicle. The system includes scene analysis and prediction module 204, which is in communication with trajectory planning and control module 274. Scene analysis and prediction module 204 receives data from sensor suite 224, obstacle detection module 228, and vehicle detection module 232. In some implementations, sensor suite 224 includes one or more lidar, radar, camera, and/or other sensors. Data from sensor suite 224 is used by obstacle detection module 228 to identify obstacles in the road (for example, pedestrians, debris, and/or potholes). Vehicle detection module 232 uses data from sensor suite 224 to identify other vehicles in the vicinity of the host (that is, ego) vehicle. Lange change module 212 includes prediction module 216 and gap selection module 220. Lane change module uses data from sensor suite 224, obstacle detection module 228, and/or vehicle detection module 232 to predict the location, speed, and/or acceleration of vehicles identified by vehicle detection module 232. Gap selection module 220 uses the prediction of prediction module 216 to select an available gap for an assisted lane change maneuver. In some implementations, threat assessment module 286 reviews the gap selection from gap selection module 220 for potential collisions and/or unsafe passenger conditions that might arise from performing a lane change into the selected gap (for example, confirming that the selected gap exists). Position data, speed data, acceleration profile data, and the threat assessment is received by trajectory planning and control module 274.

Trajectory planning and control module 274 includes gap alignment module 278 and lane change path determination module 282. In some implementations, gap alignment module 278 determines a longitudinal trajectory (that is, forward and backward) to align the ego vehicle with the selected gap.

In some implementations, gap alignment module 278 verifies that the data from scene analysis and prediction module 204 can be used to perform a successful lane change. Lane change path determination module 282 determines a longitudinal and lateral trajectory to perform the lane change maneuver. The determined trajectories are used by lane change execution module 208 to execute the lane change maneuver.

Lane change execution module 208 includes autonomous vehicle control system 250, transmission control module 254 (used to control the vehicle transmission), acceleration control module 258 (used to control the vehicle acceleration), braking control module 262 (used to control vehicle braking), user interface 270, and steering control module 266 (used to control vehicle direction and tire angle). Autonomous vehicle control system 250 interacts with and in some implementations, controls and/or communicates with the other elements of lane change execution module 208. In some implementations, user interface 270 includes visual, haptic, and/or auditory alerts informing a user within the host vehicle that an assisted lane change can be performed, how to perform the lane change, and/or that an assisted lane change maneuver is about to be, and/or is currently being executed.

Determining a Prediction Segment

FIGS. 3A-3D are a flowchart of an example method for generating a location and velocity prediction of target vehicles in the vicinity of a host vehicle. At 304, control selects an initial target vehicle (of the target vehicles in the vicinity of the host vehicle that require analysis). At 308, control determines if the prediction time (that is, the prediction length) is 0 (in other words, control determines whether this the first prediction segment). If yes, control transfers to 312. If the prediction time is not 0, control transfers to 324. At 324, control receives vehicle target vehicle data from the prediction data (that is, the previous prediction segment and/or multiple previous prediction segments) and control continues to 328. At 312, control receives target vehicle data (such as position, speed, and/or acceleration) in vehicle coordinate system (VCS) format. At 316, control converts the VCS data to Frenet data (which defines the data with respect to the road) and assigns the target vehicle to a lane based on lateral position in the Frenet frame. In some implementations, it is assumed that the host (that is, ego) vehicle is at the center of its respective lane. In some implementations, a target vehicle is assigned to adjacent lanes based its lateral distant from the host vehicle. For example, a target vehicle that is a half lane width away is assigned to an adjacent lane and a target more than 1.5 lane widths away is assigned to the first lane beyond the adjacent lane and so on. At 320, control assigns the target vehicle to initial mode and continues to 328.

At 328, control determines if three conditions are true. In the first condition, control determines whether a lead vehicle exists in front of the target vehicle. In some implementations, a lead vehicle exists if a vehicle is detected ahead of the target vehicle by the host vehicle. In some implementations, a lead vehicle exists if a vehicle is detected ahead of the target vehicle within a threshold distance. If a lead vehicle exists, control determines whether the second and third conditions are also true. In the first condition, control determines whether the gap between the lead vehicle and the target vehicle is less than a threshold gap size (that is, the follow distance gap). In some implementations, the follow distance gap is based on the length of the host vehicle, such as 3, 4, 5, 6, or 10 vehicle lengths. In the third condition, control determines if the target vehicle velocity is greater than the lead vehicle velocity. If all three conditions are true, control transfers to 336. If less than all three conditions are true (for example 0, 1, or 2 conditions are true), control transfers to 332. At 332, control determines if the target vehicle is in follow mode. If the target vehicle is in follow mode (for example, the target vehicle was assigned to follow mode in the previous prediction segment), control transfers to 336. If the target vehicle is not in follow mode, control transfers to 340.

Figure 3A:
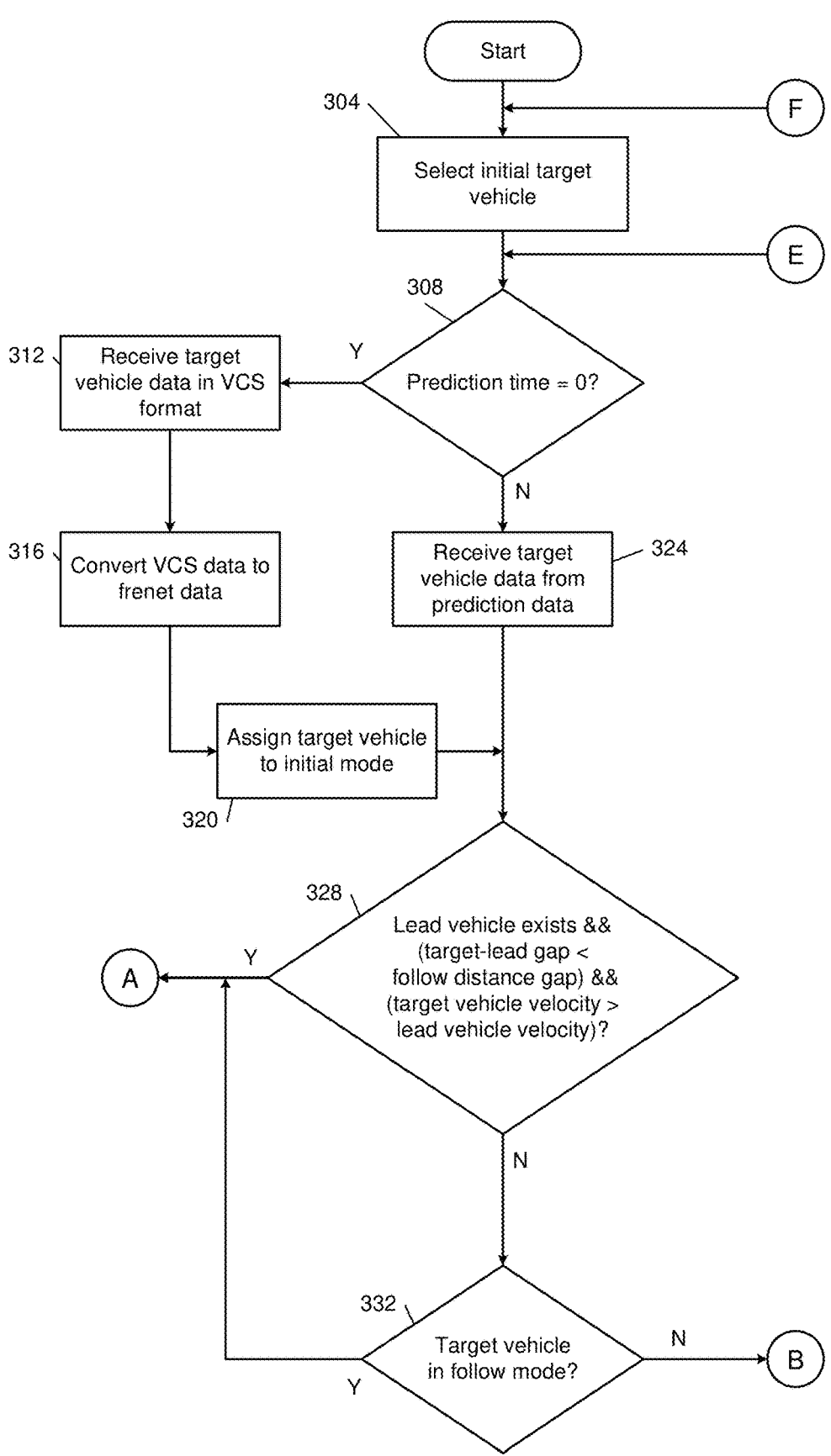
FIGS. 3A-3D together form a flowchart of an example method for predicting vehicle locations and velocities.
Figure 3B:
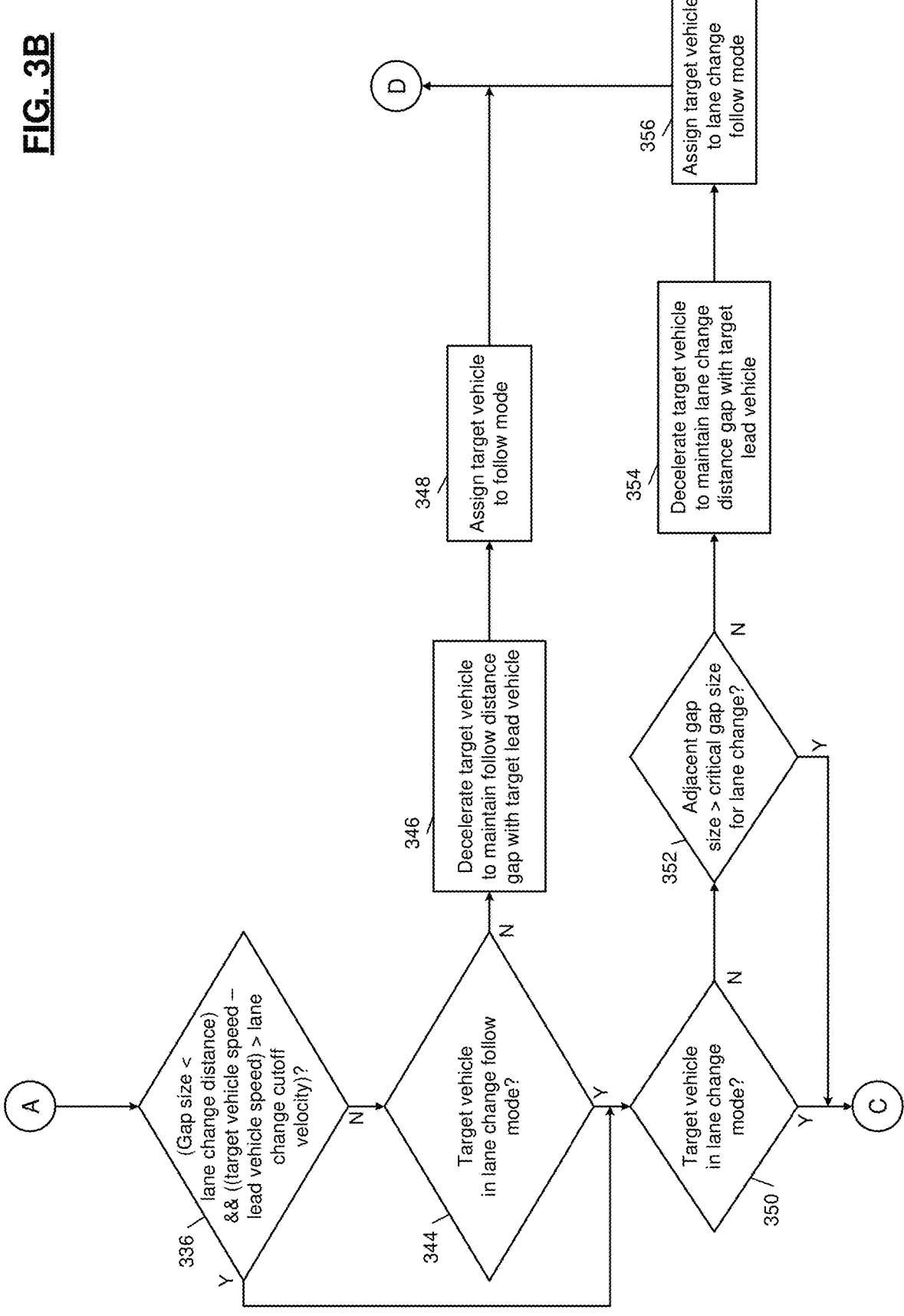

FIG. 3B continues at 336. At 336, control determines whether two conditions are both true. First, control determines whether the gap between the target vehicle and its lead vehicle is less than a lane change threshold distance. In some implementations, the lane change threshold distance is based on the length of the host vehicle, such as 1, 2, 3, or 4 vehicle lengths. Second, control determines whether the difference between the target vehicle speed and the lead vehicle speed is greater than a threshold velocity (for example, the lane change cut off velocity). In some implementations, the lane change cut off velocity falls between a range of 5-15 miles per hour. If both conditions are true, control transfers to 350. If only one or none of the conditions are true, control transfers to 344. At 344, control determines whether the target vehicle is in lane change follow mode. If the target vehicle is in lane change follow mode, control transfers to 350. If the vehicle is not in lane change follow mode, control transfers to 346.

At 346, control decelerates the target vehicle to maintain the follow distance gap between the target vehicle and the lead vehicle. In some implementations, the follow distance gap is larger than the lane change threshold distance. In some implementations, the follow distance gap is based on the length of the host vehicle, such as 2, 3, 4, or 5 vehicle lengths. At 348, control assigns the target vehicle to follow mode, and control continues to 378. At 350, control determines whether the target vehicle is in lane change mode. If yes, control transfers to 366. If not, control transfers to 352. At 352, control determines whether the size of an adjacent gap (for example, a gap in a lane adjacent to the target vehicle) is greater than a critical gap size (for example, a gap sufficient for a lane change). In some implementations, the critical gap size is between 10-30 meters. If the adjacent gap size is greater than the critical gap size, control transfers to 366. If the adjacent gap size is not greater than the critical gap size, control transfers to 354. At 354, control decelerates the target vehicle prediction to maintain the lane change distance gap with the lead vehicle. Control then continues to 356 and assigns the target vehicle to lane change follow mode.

Figure 3C:
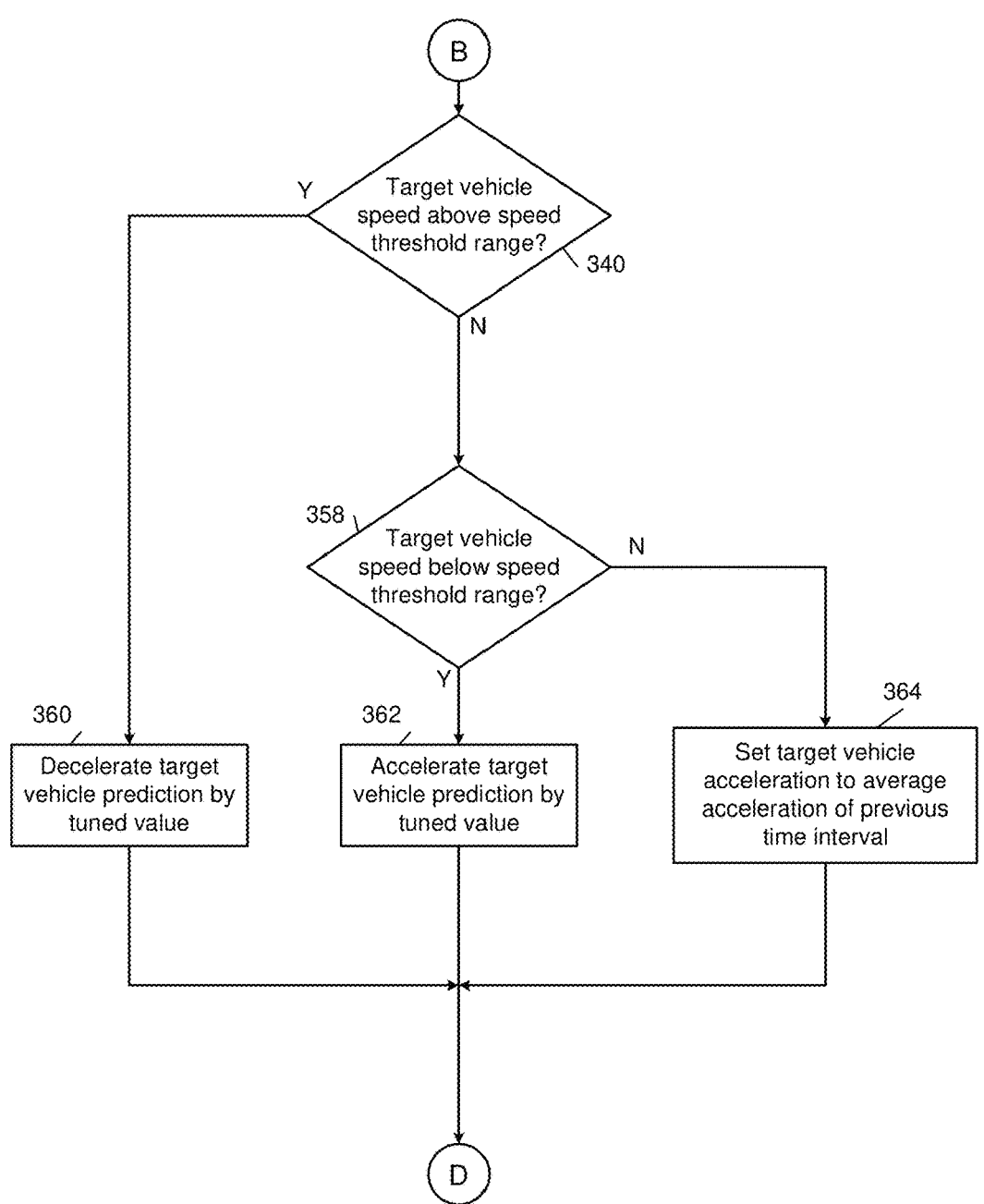

FIG. 3C continues at 340. At 340, control determines if the target vehicle speed is above a threshold range (that is, a threshold range surrounding the speed limit-such as 5, 10, 15, 20 above and/or below the speed limit). For example, if the speed limit is 55 kilometers per hour, in some implementations the threshold range is 40 kph-60 kph. If the target vehicle is above the threshold range (that is, above the highest value of the threshold range), control transfers to 360. If the target vehicle is not above the threshold range (that is, within or below the threshold range), control transfers to 358.

At 360, control decelerates the target vehicle by a tuned value (for example, so that the target vehicle decelerates to lessen the amount the target vehicle is speed is above the threshold range or so that the target vehicle decelerates to within the threshold range). After 360, control continues to 378.

At 358, control determines if the target vehicle speed is below the speed threshold range. If the vehicle speed is not below the speed threshold range, control transfers to 364. If the vehicle speed is below the speed threshold range, control transfers to 362. At 362, control accelerates the target vehicle by the tuned value and control continues to 378. In some implementations, the tuned value is 0.5, 1, 1.5, 2, 2.5, or 3 m/s$^2$. In some implementations, the tuned value for acceleration and deceleration is the same. In some implementations, the tuned value for acceleration and deceleration is different. In some implementations, the tuned value for acceleration is smaller than the tuned value for deceleration. In some implementations, the tuned value is less than the difference between the target vehicle speed and the top value of the threshold range.

At 364, control sets the target vehicle acceleration to be an average acceleration of the previous time intervals. In some implementations, the average acceleration is based on all previous time intervals. In some implementations, the average acceleration is based on the immediately previous time interval. In some implementations, the average acceleration is based on a set of the previous time intervals (for example the previous 2, 3, 5, 10, or 20 intervals). After 364, control continues to 378.

Figure 3D:
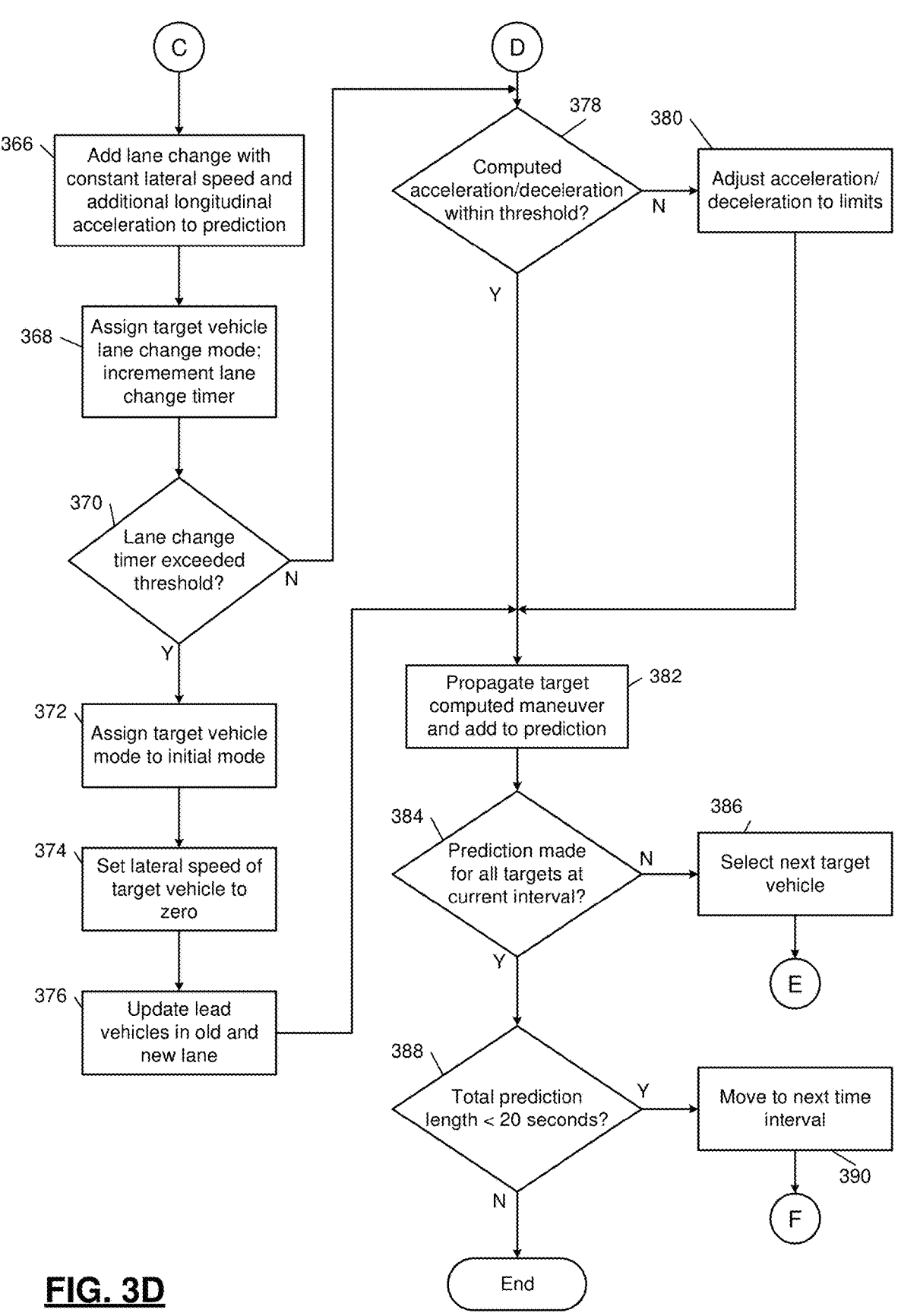

FIG. 3D continues at 366. At 366, control adds a lane change maneuver (or a portion of a lane change maneuver) with constant lateral speed and additional longitudinal (for example, forward) acceleration to the prediction. At 368, control assigns the target vehicle to lane change mode and increments a lane change timer. The lateral speed is adjusted so that the lane change can be completed within a threshold time (for example, 1, 3, 5, or 10 seconds). At 370, control determines if the lane change timer has exceeded the threshold time. If the timer has been exceeded (for example, the lane change maneuver is complete), control continues to 372. If the timer has not been exceeded (for example, the lane change is still in process), control transfers to 378. At 372, control assigns the target vehicle to initial mode. At 374, the lateral speed of the target vehicle is set to zero. At 376, the lead vehicles in the previous lane and the new lane are updated, and control continues to 382.

At 378, control determines if the acceleration/deceleration of the target vehicle computed in the previous steps (for example, at steps 360, 362, and 364) of the method is within a threshold (for example, if the acceleration can be safely or comfortably executed and/or within the physical limits of the vehicle). In some implementations, the threshold value is 0.5, 1, 1.5, 2, 2.5, or 3 m/s$^2$. In some implementations, the threshold value for acceleration and deceleration is the same. In some implementations, the threshold value for acceleration and deceleration is different. In some implementations, the threshold value for acceleration is smaller than the threshold value for deceleration. If the acceleration change is not within the threshold, control transfers to 380. If the acceleration change is within the threshold, control transfers to 382. At 380, the acceleration change is adjusted to be within the threshold limit and control continues to 382. At 382, control propagates the target vehicle by the computed maneuver (for example, lane change maneuver portion, maintained speed, and/or acceleration change) and adds the computed maneuver to the prediction. Control continues to 384 and determines if a prediction has been made for all target vehicles at the current time interval. If a prediction has not been made for all target vehicles at the current time interval, control transfers to 386. If yes, control transfers to 388.

At 386, control selects the next target vehicle and control continues to 308. At 388, control determines if the total prediction length is less than 20 seconds. In some implementations, the prediction is 5, 10, 15, 20, or 30 seconds. If the prediction total length is greater than 20 seconds, control ends. If the prediction is less than 20 seconds, control transfers to 390. At 390, control moves to the next time interval and transfers to 304.

Conclusion

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a nontransitory computer-readable medium may be executed in a different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship encompasses a direct relationship where no other intervening elements are present between the first and second elements as well as an indirect relationship where one or more intervening elements are present between the first and second elements.

As noted below, the term "set" generally means a grouping of one or more elements. However, in various implementations a "set" may, in certain circumstances, be the empty set (in other words, the set has zero elements in those circumstances). As an example, a set of search results resulting from a query may, depending on the query, be the empty set. In contexts where it is not otherwise clear, the term "non-empty set" can be used to explicitly denote exclusion of the empty set—that is, a non-empty set will always have one or more elements.

A "subset" of a first set generally includes some of the elements of the first set. In various implementations, a subset of the first set is not necessarily a proper subset: in certain circumstances, the subset may be coextensive with (equal to) the first set (in other words, the subset may include the same elements as the first set). In contexts where it is not otherwise clear, the term "proper subset" can be used to explicitly denote that a subset of the first set must exclude at least one of the elements of the first set. Further, in various implementations, the term "subset" does not necessarily exclude the empty set. As an example, consider a set of candidates that was selected based on first criteria and a subset of the set of candidates that was selected based on second criteria; if no elements of the set of candidates met the second criteria, the subset may be the empty set. In contexts where it is not otherwise clear, the term "non-empty subset" can be used to explicitly denote exclusion of the empty set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" can be replaced with the term "controller" or the term "circuit." In this application, the term "controller" can be replaced with the term "module." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); processor hardware (shared, dedicated, or group) that executes code; memory hardware (shared, dedicated, or group) that is coupled with the processor hardware and stores code executed by the processor hardware; other suitable hardware components that provide the described functionality; or a combination of some or all of the above, such as in a system-on-chip.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2020 (also known as the WIFI wireless networking standard) and IEEE Standard 802.3-2018 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

The memory hardware may also store data together with or separate from the code. Shared memory hardware encompasses a single memory device that stores some or all code from multiple modules. One example of shared memory hardware may be level 1 cache on or near a microprocessor die, which may store code from multiple modules. Another example of shared memory hardware may be persistent storage, such as a solid state drive (SSD) or magnetic hard disk drive (HDD), which may store code from multiple modules. Group memory hardware encompasses a memory device that, in combination with other memory devices, stores some or all code from one or more modules. One example of group memory hardware is a storage area network (SAN), which may store code of a particular module across multiple physical devices. Another example of group memory hardware is random access memory of each of a set of servers that, in combination, store code of a particular module. The term memory hardware is a subset of the term computer-readable medium.

The apparatuses and methods described in this application may be partially or fully implemented by a special-purpose computer created by configuring a general-purpose computer to execute one or more particular functions embodied in computer programs. Such apparatuses and methods may be described as computerized or computer-implemented apparatuses and methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special-purpose computer, device drivers that interact with particular devices of the special-purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The term "set" generally means a grouping of one or more elements. The elements of a set do not necessarily need to have any characteristics in common or otherwise belong together. The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The invention claimed is:

1. A system comprising:

a vehicle location prediction module configured to:

receive sensor data associated with a set of target vehicles, wherein the sensor data indicates positions of the set of target vehicles with respect to a host vehicle; and for each respective target vehicle of a subset of the set of target vehicles, determine a prediction corresponding to the respective target vehicle, wherein:

the prediction is based on a set of criteria, the prediction includes a plurality of prediction segments corresponding to future time intervals, the prediction indicates a position of the respective target vehicle at each of the plurality of prediction segments, a first prediction segment of the plurality of prediction segments is based on the sensor data, the first prediction segment of the plurality of prediction segments includes:

based on a first outcome of the set of criteria, maintaining an acceleration associated with the respective target vehicle, based on a second outcome of the set of criteria, adjusting the acceleration associated with the respective target vehicle, and based on a third outcome of the set of criteria, executing a portion of a lane change maneuver associated with the respective target vehicle, a second prediction segment of the plurality of prediction segments is based on the first prediction segment, and the set of criteria includes:

a criterion that is met when a lead vehicle exists ahead of the respective target vehicle, a criterion that is met when a speed of the respective target vehicle exceeds a speed of the lead vehicle, and a criterion that is met when an acceleration of the respective target vehicle is outside of a threshold acceleration range; and a gap selection module configured to determine a host vehicle lane change location based on the prediction corresponding to the respective target vehicle.

2. The system of claim 1 wherein the plurality of prediction segments corresponds to contiguous time intervals of equal duration.

3. The system of claim 2 wherein a duration of the contiguous time intervals is 10-500 milliseconds.

4. The system of claim 1 wherein the prediction indicates a speed of the respective target vehicle at teach of the plurality of prediction segments.

5. The system of claim 1 wherein the sensor data is received from a set of sensors configured to detect the set of target vehicles.

6. The system of claim 1 comprising an autonomous vehicle control module configured to execute an automated lane change maneuver based on the host vehicle lane change location.

7. The system of claim 1 wherein the vehicle location prediction module is configured to:

in response to a determination that a duration of the prediction exceeds a prediction threshold, output the prediction to the gap selection module, and in response to a determination that the duration of the prediction does not exceed a prediction threshold, determine a third prediction segment.

8. The system of claim 1 wherein the vehicle location prediction module is configured to determine a prediction corresponding to each vehicle in the set of target vehicles.

9. The system of claim 1 wherein determining the host vehicle lane change location is based on a gap between two target vehicles of the set of target vehicles including:

a size of the gap, a duration of existence associated with the gap, or a time of appearance associated the gap.

10. The system of claim 1 wherein the set of criteria includes:

a criterion that is met when the respective target vehicle is categorized in a first category, a criterion that is met when the respective target vehicle is categorized in a second category, a criterion that is met when the respective target vehicle is categorized in a third category, a criterion that is met when a gap between the lead vehicle and the respective target vehicle meets a first threshold distance, a criterion that is met when the gap between the lead vehicle and the respective target vehicle meets a second threshold distance, a criterion that is met when the speed of the respective target vehicle exceeds a threshold speed, a criterion that is met when a gap exists adjacent to the respective target vehicle, and a criterion that is met when the speed of the respective target vehicle is outside of a threshold speed range.

11. A method comprising:

receiving sensor data associated with a set of target vehicles, wherein the sensor data indicates positions of the set of target vehicles with respect to a host vehicle;

for each respective target vehicle of a subset of the set of target vehicles, determining a prediction corresponding to the respective target vehicle, wherein:

the prediction is based on a set of criteria, the prediction includes a plurality of prediction segments corresponding to future time intervals, the prediction indicates a position of the respective target vehicle at each of the plurality of prediction segments, a first prediction segment of the plurality of prediction segments is based on the sensor data, the first prediction segment of the plurality of prediction segments includes:

based on a first outcome of the set of criteria, maintaining an acceleration associated with the respective target vehicle, based on a second outcome of the set of criteria, adjusting the acceleration associated with the respective target vehicle, and based on a third outcome of the set of criteria, executing a portion of a lane change maneuver associated with the respective target vehicle, a second prediction segment of the plurality of prediction segments is based on the first prediction segment, and the set of criteria includes:

a criterion that is met when a lead vehicle exists ahead of the respective target vehicle, a criterion that is met when a speed of the respective target vehicle exceeds a speed of the lead vehicle, and a criterion that is met when an acceleration of the respective target vehicle is outside of a threshold acceleration range; and determining a host vehicle lane change location based on the prediction corresponding to the respective target vehicle.

12. The method of claim 11 wherein:

plurality of prediction segments corresponds to contiguous time intervals of equal duration;

a duration of the contiguous time intervals is 10-500 milliseconds;

the prediction indicates a speed of the respective target vehicle at teach of the plurality of prediction segments; and the sensor data is received from a set of sensors configured to detect the set of target vehicles.

13. The method of claim 11 comprising executing an automated lane change maneuver based on the host vehicle lane change location.

14. The method of claim 11 comprising:

in response to a determination that a duration of the prediction exceeds a prediction threshold, outputting the prediction; and in response to a determination that the duration of the prediction does not exceed a prediction threshold, determining a third prediction segment.

15. The method of claim 11 wherein determining the host vehicle lane change location is based on a gap between two target vehicles of the set of target vehicles including:

a size of the gap, a duration of existence associated with the gap, or a time of appearance associated the gap.

16. A non-transitory computer-readable storage medium storing processor-executable instructions, the instructions comprising:

receiving sensor data associated with a set of target vehicles, wherein the sensor data indicates positions of the set of target vehicles with respect to a host vehicle;

for each respective target vehicle of a subset of the set of target vehicles, determining a prediction corresponding to the respective target vehicle, wherein:

the prediction is based on a set of criteria, the prediction includes a plurality of prediction segments corresponding to future time intervals, the prediction indicates a position of the respective target vehicle at each of the plurality of prediction segments, a first prediction segment of the plurality of prediction segments is based on the sensor data, the first prediction segment of the plurality of prediction segments includes:

based on a first outcome of the set of criteria, maintaining an acceleration associated with the respective target vehicle, based on a second outcome of the set of criteria, adjusting the acceleration associated with the respective target vehicle, and based on a third outcome of the set of criteria, executing a portion of a lane change maneuver associated with the respective target vehicle, a second prediction segment of the plurality of prediction segments is based on the first prediction segment; and the set of criteria includes:

a criterion that is met when a lead vehicle exists ahead of the respective target vehicle, a criterion that is met when a speed of the respective target vehicle exceeds a speed of the lead vehicle, and a criterion that is met when an acceleration of the respective target vehicle is outside of a threshold acceleration range; and determining a host vehicle lane change location based on the prediction corresponding to the respective target vehicle.

17. The non-transitory computer-readable storage medium of claim 16 wherein the instructions include:

plurality of prediction segments corresponds to contiguous time intervals of equal duration;

a duration of the contiguous time intervals is 10-500 milliseconds;

the prediction indicates a speed of the respective target vehicle at teach of the plurality of prediction segments; and the sensor data is received from a set of sensors configured to detect the set of target vehicles.

18. The non-transitory computer-readable storage medium of claim 16 wherein the instructions include executing an automated lane change maneuver based on the host vehicle lane change location.

19. The non-transitory computer-readable storage medium of claim 16 wherein the instructions include:

in response to a determination that a duration of the prediction exceeds a prediction threshold, outputting the prediction; and in response to a determination that the duration of the prediction does not exceed a prediction threshold, determining a third prediction segment.

20. The non-transitory computer-readable storage medium of claim 16 wherein determining the host vehicle lane change location is based on a gap between two target vehicles of the set of target vehicles including:

a size of the gap, a duration of existence associated with the gap, or a time of appearance associated the gap.

* * * * *